(12) United States Patent
Brandt

(10) Patent No.: US 10,982,582 B2
(45) Date of Patent: Apr. 20, 2021

(54) SYSTEMS FOR AND METHODS OF FILLING MUFFLERS WITH FIBROUS MATERIAL

(71) Applicant: Owens Corning Intellectual Capital, LLC, Toledo, OH (US)

(72) Inventor: Luc J. Brandt, Henri-Chapelle (BE)

(73) Assignee: Owens Corning Intellectual Capital, LLC, Toledo, OH (US)

(*) Notice: Subject to any disclaimer, the term of this patent is extended or adjusted under 35 U.S.C. 154(b) by 31 days.

(21) Appl. No.: 16/463,901

(22) PCT Filed: Oct. 11, 2017

(86) PCT No.: PCT/US2017/056009
§ 371 (c)(1),
(2) Date: May 24, 2019

(87) PCT Pub. No.: WO2018/118186
PCT Pub. Date: Jun. 28, 2018

(65) Prior Publication Data
US 2019/0383199 A1    Dec. 19, 2019

(30) Foreign Application Priority Data
Dec. 19, 2016    (EP) .................................... 16306724

(51) Int. Cl.
*F01N 13/18* (2010.01)
*F01N 1/24* (2006.01)
*G10K 11/162* (2006.01)

(52) U.S. Cl.
CPC .............. *F01N 13/18* (2013.01); *F01N 1/24* (2013.01); *G10K 11/162* (2013.01); *B23P 2700/50* (2013.01); *F01N 2310/02* (2013.01); *F01N 2450/06* (2013.01); *F01N 2490/10* (2013.01)

(58) Field of Classification Search
CPC ........ F01N 2450/06; F01N 1/006; F01N 1/04; F01N 1/10; F01N 1/125; F01N 1/24; F01N 13/1888–13/1894; F01N 2310/02; F01N 2470/02; B23P 2700/50; Y10T 29/49398
See application file for complete search history.

(56) References Cited

U.S. PATENT DOCUMENTS

| 4,239,091 A | 12/1980 | Negrao |
| 5,976,453 A | 11/1999 | Nilsson et al. |
| 6,317,959 B1* | 11/2001 | Nilsson .................. F16L 59/14 |
| | | 29/455.1 |

(Continued)

FOREIGN PATENT DOCUMENTS

| CN | 2047724 U | 11/1989 |
| CN | 2272526 Y | 1/1998 |

(Continued)

OTHER PUBLICATIONS

Communication from EP Application No. 17788053.1 dated Jun. 24, 2020.

(Continued)

*Primary Examiner* — Matthew P Travers
(74) *Attorney, Agent, or Firm* — Calfee, Halter & Griswold LLP

(57) ABSTRACT

Systems for and methods of evacuating air from a muffler while it is being filled with a fibrous material are disclosed.

5 Claims, 7 Drawing Sheets

(56) References Cited

U.S. PATENT DOCUMENTS

| | | |
|---|---|---|
| 6,543,577 B1 | 4/2003 | Ferreira et al. |
| 6,607,052 B2 | 8/2003 | Brandt et al. |
| 7,975,382 B2 | 7/2011 | Brandt et al. |
| 8,136,629 B2 | 3/2012 | Inoue et al. |
| 8,590,155 B2 | 11/2013 | Nilsson et al. |
| 9,133,754 B2 | 9/2015 | Bauer et al. |
| 2003/0042070 A1* | 3/2003 | Brandt ................. F01N 1/04 181/256 |
| 2005/0001012 A1 | 1/2005 | Brandt et al. |
| 2005/0279570 A1 | 12/2005 | Van Arsdale |
| 2011/0031660 A1* | 2/2011 | Huff ................. B29C 70/305 264/571 |

FOREIGN PATENT DOCUMENTS

| | | |
|---|---|---|
| CN | 201836868 U | 5/2011 |
| CN | 202544967 U | 11/2012 |
| CN | 203420763 U | 2/2014 |
| CN | 204716363 U | 10/2015 |
| GB | 312937 A | 12/1930 |
| GB | 1465218 A | 2/1977 |
| JP | 09228820 A | 9/1997 |
| JP | 09288488 A | 11/1997 |

OTHER PUBLICATIONS

Extended European Search Report from EP Application No. 16306724.2 dated May 3, 2017.
International Search Report and Written Opinion from PCT/US2017/056009 dated Dec. 7, 2017.
Office Action from CN Application No. 201780078510.2 dated Jan. 8, 2021.

* cited by examiner

SYSTEMS FOR AND METHODS OF FILLING MUFFLERS WITH FIBROUS MATERIAL

RELATED APPLICATIONS

This application is the U.S. national stage entry of PCT/US2017/056009, filed on Oct. 11, 2017, which claims priority to and all benefit of European Patent Application Serial No. 16306724.2, filed on Dec. 19, 2016 and titled SYSTEMS FOR AND METHODS OF FILLING MUFFLERS WITH FIBROUS MATERIAL, the entire disclosure of which are fully incorporated herein by reference.

The general inventive concepts relate to systems for and methods of filling mufflers with fibrous material.

BACKGROUND

It is known to introduce fibrous material (e.g., glass fibers) into a body of a muffler to absorb and attenuate sound produced by the muffler during operation.

As noted in U.S. Pat. No. 7,975,382, the entire disclosure of which is incorporated herein by reference, many types of exhaust mufflers are produced by mechanically joining multiple pieces to form a muffler shell. For example, one common type of exhaust muffler is known as a spun muffler. Spun mufflers are made by forming a sheet of material into the desired shape to form the muffler body and attaching end caps to this body by welding or crimping to form the muffler shell. Another common type of exhaust muffler is a clamshell muffler, which is assembled by joining an upper section to a lower section by welding or crimping. Both spun mufflers and clamshell mufflers are generally divided into multiple chambers by baffles or partitions, and contain one or more inlet and outlet pipes that span between the chambers to input and exhaust the gases from the muffler.

A common material used to fill exhaust mufflers is continuous glass fibers. The fibers usually fill one or more of the muffler chambers and are often inserted into the muffler in a texturized, or "bulked up," form. It is known to insert these bulked up fibers into one of the muffler shell components or chambers prior to assembling the muffler shell. It is also known to introduce the bulked up fibers into one of the muffler shell components or chambers when the muffler shell is in a partially assembled state.

For example, a texturizing nozzle can be used to introduce the texturized fibrous material into the muffler. For example, as disclosed in U.S. Pat. No. 5,976,453, the entire disclosure of which is incorporated herein by reference, a texturizing device uses compressed air to advance a strand of fibrous material through the device, wherein the fibers of the strand are separated and entangled (i.e., texturized) as the fibrous material exits the device.

Because the texturizing nozzle introduces a considerable amount of compressed air into the muffler cavity being filled with the texturized fibrous material, it is important that this air has a path of exit so that it does not disrupt proper distribution of the texturized fibrous material within the muffler cavity being filled therewith.

The inlet and/or outlet pipes can have perforations therein. Likewise, the baffles or partitions can have perforations therein. In general, these perforations are sized to allow combustion gases to pass therethrough while preventing the texturized fibrous material from doing so. In this manner, combustion gases entering the muffler can flow out of the pipes and/or through the baffles to interact with the texturized fibrous material, which results in sound absorption and attenuation, and then back into the pipes and/or through the baffles as the combustion gases continue their path through and out of the muffler.

These perforations are also used for controlling distribution of the texturized fibrous material as it is introduced into the muffler. As noted in the '382 patent, it is important to control the introduction of the texturized fibrous material into the muffler so as to achieve an even distribution of the texturized fibrous material with a sufficient density to muffle the noise of the exhaust gases. Typically a vacuum source (e.g., the vacuum source 42 in the '382 patent) is used to create a pressure differential ΔP that draws the compressed air being introduced into the muffler during the filling operation out of the muffler.

For example, as shown in FIG. 1, a conventional filling system 100 introduces texturized fibrous material 102 into a muffler cavity 104 via an opening 106 on a first end 108 of a muffler 110, while a partial vacuum (ΔP) is created at an opening 112 on a second end 114 of the muffler 110 (opposite the first end 108) by a vacuum source 120.

The muffler 110 includes a body 130 with two pipes 132 extending at least partially through the body 130. The pipes 132 can be inlet and/or outlet pipes for carrying the exhaust gases through the muffler 110. At least a portion of each pipe 132 includes perforations 140. The muffler 110 also includes a baffle 134 that divides the muffler cavity 104 into a first chamber 136 and a second chamber 138. At least a portion of the baffle 134 includes perforations 142. As noted above, the perforations 140, 142 are sized and/or shaped to allow combustion gases to pass therethrough while preventing the texturized fibrous material 102 from doing so.

During the filling operation, the muffler 110 is held in place between a first member 122 that interfaces with the first end 108 and a second member 124 that interfaces with the second end 114. Because a body 130 of the muffler 110 is in a partially assembled state, i.e., end caps have yet to be joined to the body 130, the first member 122 abuts or fits into the open end 106 of the body 130 and the second member 124 abuts or fits into the open end 112 of the body 130. In particular, the first member 122 forms a substantially air-tight interface with the body 130 at the first end 108 and the second member 124 forms a substantially air-tight interface with the body 130 at the second end 114.

The first member 122 includes openings through which texturizing nozzles 150 can be inserted for delivery of the texturized fibrous material 102 into the muffler cavity 104. The first member 122 also covers any ends 152 of the pipes 132 in proximity to the first end 108 of the muffler 110, wherein the ends 152 can also be separately plugged to prevent any of the texturized fibrous material 102 from being drawn therein.

The second member 124 includes openings through which the vacuum source 120 can interface with any ends 154 of the pipes 132 in proximity to the second end 114 of the muffler 110. In this manner, the vacuum source 120 can evacuate air from the inner cavity 104 (i.e., the first chamber 136 and the second chamber 138), including air introduced by the filling nozzles 150.

In particular, air within the inner cavity 104 can flow between the first chamber 136 and the pipes 132 via the perforations 140. Likewise, air within the inner cavity 104 can flow between the first chamber 136 and the second chamber 138 via the perforations 142. Because the vacuum source 120 is drawing air out of the inner cavity 104 through the ends 154 of the pipes 132 (the opposite ends 152 having been plugged), air in (or flowing into) the second chamber 138 is pulled into the first chamber 136 through the perforations 142. Similarly, air in (or flowing into) the first chamber 136 is pulled into the pipes 132 through the perforations 140. Thus, the air being introduced into the inner cavity 104 by the texturizing nozzles 150 has a flow path out of the muffler 110. Various portions of the flow path are illustrated in FIG. 1 by dashed arrows.

By providing a flow path out of the muffler 110 for the air introduced into the inner cavity 104 by the texturizing nozzles 150, the perforations 140, 142 facilitate the controlled distribution of the texturized fibrous material 102 within the inner cavity 104. In other words, the perforations 140, 142 prevent the air being introduced into the inner cavity 104 from disrupting the gradual build up of the texturized fibrous material 102 in the chamber being filled (i.e., the first chamber 136). Thus, a relatively even distribution of the texturized fibrous material 102 within the first chamber 136 to a desired density can be readily achieved. This even distribution of the texturized fibrous material 102 also ensures that the perforations 140, 142 are sufficiently covered by the texturized fibrous material 102 for optimal sound attenuation.

However, problems arise when perforations (e.g., the perforations 140, 142) are not present or are insufficient (e.g., in quantity, size) for properly evacuating the air being introduced into the muffler during a filling operation.

For purposes of illustration, a hypothetical muffler 210 lacking perforations (or lacking sufficient perforations) in one or more pipes and/or one or more baffles therein is shown in FIG. 2. In FIG. 2, a conventional filling system 200 introduces texturized fibrous material 102 into a muffler cavity 204 via an opening 206 on a first end 208 of a muffler 210, while a partial vacuum (AP) is created at an opening 212 on a second end 214 of the muffler 210 (opposite the first end 208) by a vacuum source 120.

The muffler 210 includes a body 230 with two pipes 232 extending at least partially through the body 230. The pipes 232 can be inlet and/or outlet pipes for carrying the exhaust gases through the muffler 210. In this example, each pipe 232 lacks any perforations (or lacks perforations suitable for sufficiently evacuating the amount of air being introduced into the muffler 210 during the filling operation). The muffler 210 also includes a baffle 234 that divides the muffler cavity 204 into a first chamber 236 and a second chamber 238. In this example, the baffle 234 lacks any perforations (or lacks perforations suitable for sufficiently evacuating the amount of air being introduced into the muffler 210 during the filling operation).

During the filling operation, the muffler 210 is held in place between a first member 122 that interfaces with the first end 208 and a second member 124 that interfaces with the second end 214. Because a body 230 of the muffler 210 is in a partially assembled state, i.e., end caps have yet to be joined to the body 230, the first member 122 abuts or fits into the open end 206 of the body 230 and the second member 124 abuts or fits into the open end 212 of the body 230. In particular, the first member 122 forms a substantially air-tight interface with the body 230 at the first end 208 and the second member 124 forms a substantially air-tight interface with the body 230 at the second end 214.

The first member 122 includes openings through which texturizing nozzles 150 can be inserted for delivery of the texturized fibrous material 102 into the muffler cavity 204. The first member 122 also covers any ends 252 of the pipes 232 in proximity to the first end 208 of the muffler 210, wherein the ends 252 can also be separately plugged.

The second member 124 includes openings through which the vacuum source 120 can interface with any ends 254 of the pipes 232 in proximity to the second end 214 of the muffler 210. However, the vacuum source 120 is unable to effectively evacuate air from the inner cavity 204 (e.g., the first chamber 236 being filled with the texturized fibrous material 102), including air introduced by the filling nozzles 150, because the lack of perforations (or the lack of suitable perforations) means the air in the inner cavity 204 does not have a sufficient flow path through the pipes 232 and out of the muffler 210 during the filling operation.

In particular, air within the inner cavity 204 cannot effectively flow between the first chamber 236 and the pipes 232 due to the lack of perforations in the pipes 232. Likewise, air within the inner cavity 204 cannot effectively flow between the first chamber 236 and the second chamber 238 due to the lack of perforations in the baffle 234. Consequently, the air being introduced into inner cavity 204 during the filling operation (i.e., by the filling nozzles 150) builds up in the chamber being filled (i.e., the first chamber 236). This unabated influx of air flows within the first chamber 236 in a disruptive and uncontrolled manner. An exemplary flow path is illustrated in FIG. 2 by dashed arrows.

Because the air being introduced into the inner cavity 204 by the texturizing nozzles 150 follows a flow path that is essentially variable and uncontrolled, it is difficult if not impossible to achieve a controlled distribution of texturized fibrous material 102 within the inner cavity 204. In other words, the lack of perforations (or suitable perforations) in the pipes 232 and/or the baffle 234 causes the air being introduced into the inner cavity 204 to disrupt the gradual build up of the texturized fibrous material 102 in the chamber being filled (i.e., the first chamber 236). Furthermore, the air pressure residing in the inner cavity 204 can negatively affect the performance of the filling nozzles 150, such that they are less capable of properly delivering and texturizing the fibrous material. Thus, an even distribution of the texturized fibrous material 102 within the first chamber 236 to a desired density cannot be readily achieved.

In view of the above, there is an unmet need for improved systems for and methods of filling a muffler with a fibrous material in a controlled and even manner.

SUMMARY

The general inventive concepts relate to and contemplate improved systems for and methods of filling mufflers with fibrous material.

In an exemplary embodiment, an insert for use in filling a muffler cavity with a fibrous material is disclosed. The insert comprises a body having a lower surface and one or more side walls extending from the lower surface to define an insert cavity. The insert has a size and shape to at least partially fit within the muffler cavity. The lower surface of the body includes a pipe opening, the pipe opening having a size and shape for an end of a pipe within the muffler to pass through and into the insert cavity. The lower surface of the body includes a plurality of perforations, the perforations having a size to allow air to pass through but to prevent the fibrous material from passing through.

In some exemplary embodiments, the body further includes an upper surface that encloses the insert cavity.

In some exemplary embodiments, the lower surface of the body includes a plurality of the pipe openings.

In some exemplary embodiments, the insert further comprises a hollow post that extends from the lower surface of the body to approximately the height of the side walls (e.g., to the upper surface).

In an exemplary embodiment, a system for filling a cavity of a muffler with a fibrous material is disclosed. The system comprises a perforated member for inserting into the cavity of the muffler; a holding member for affixing the muffler and the perforated member relative to one another; a filling nozzle for delivering the fibrous material into the cavity of the muffler; and a vacuum source for evacuating air from the cavity of the muffler. The perforated member encloses an end of a pipe situated in the cavity of the muffler so that the vacuum source can draw air from the cavity of the muffler, through the perforated member, through the pipe, and out of the muffler. Furthermore, the perforated member prevents the vacuum source from drawing the fibrous material into the pipe.

In some exemplary embodiments, the holding member forms an upper surface of the perforated member.

In some exemplary embodiments, the muffler includes a baffle that divides the cavity of the muffler into a first chamber and a second chamber, wherein the perforated member is positioned at the same location in the cavity of the muffler when filling the first chamber with the fibrous material as when filling the second chamber with the fibrous material.

In some exemplary embodiments, the muffler includes a baffle that divides the cavity of the muffler into a first chamber and a second chamber, wherein the perforated member is positioned at a first location in the cavity of the muffler when filling the first chamber with the fibrous material; and wherein the perforated member is positioned at a second location in the cavity of the muffler when filling the second chamber with the fibrous material.

In some exemplary embodiments, the filling system comprises a plurality of the holding members.

In some exemplary embodiments, the filling system comprises a plurality of the filling nozzles.

In some exemplary embodiments, the fibrous material is texturized fiberglass.

In an exemplary embodiment, a method of filling a cavity of a muffler with a fibrous material is disclosed. The method comprises inserting a perforated member into the cavity of the muffler; holding the muffler so as to affix the perforated member relative to the muffler; filling the cavity of the muffler with the fibrous material; and evacuating air from the cavity of the muffler through the perforated member and an end of a pipe of the muffler that extends into the perforated member, wherein the perforated member prevents the fibrous material from entering the pipe.

In some exemplary embodiments, the method further comprises releasing the muffler and removing the perforated member from the cavity of the muffler.

In some exemplary embodiments, the method further comprises completing assembly of the muffler.

In some exemplary embodiments, the muffler includes a baffle that divides the cavity of the muffler into a first chamber and a second chamber, and the method further comprises: positioning the perforated member at a first location in the cavity of the muffler when filling the first chamber with the fibrous material; and positioning the perforated member at a second location in the cavity of the muffler when filling the second chamber with the fibrous material.

In some exemplary embodiments, the fibrous material is texturized fiberglass.

In some exemplary embodiments, one or more of the method steps are performed automatically. In some exemplary embodiments, all of the method steps are performed automatically.

Numerous other aspects, advantages, and/or features of the general inventive concepts will become more readily apparent from the following detailed description of exemplary embodiments, from the claims, and from the accompanying drawings being submitted herewith.

BRIEF DESCRIPTION OF THE DRAWINGS

The general inventive concepts as well as embodiments and advantages thereof are described below in greater detail, by way of example, with reference to the drawings in which:

FIG. 4A is a diagram showing a perspective view of the perforated insert. FIG. 4B is a diagram showing a bottom plan view of the perforated insert. FIG. 4C is a diagram showing a perspective view of the perforated insert being positioned within a muffler.

DETAILED DESCRIPTION

Figure 1:
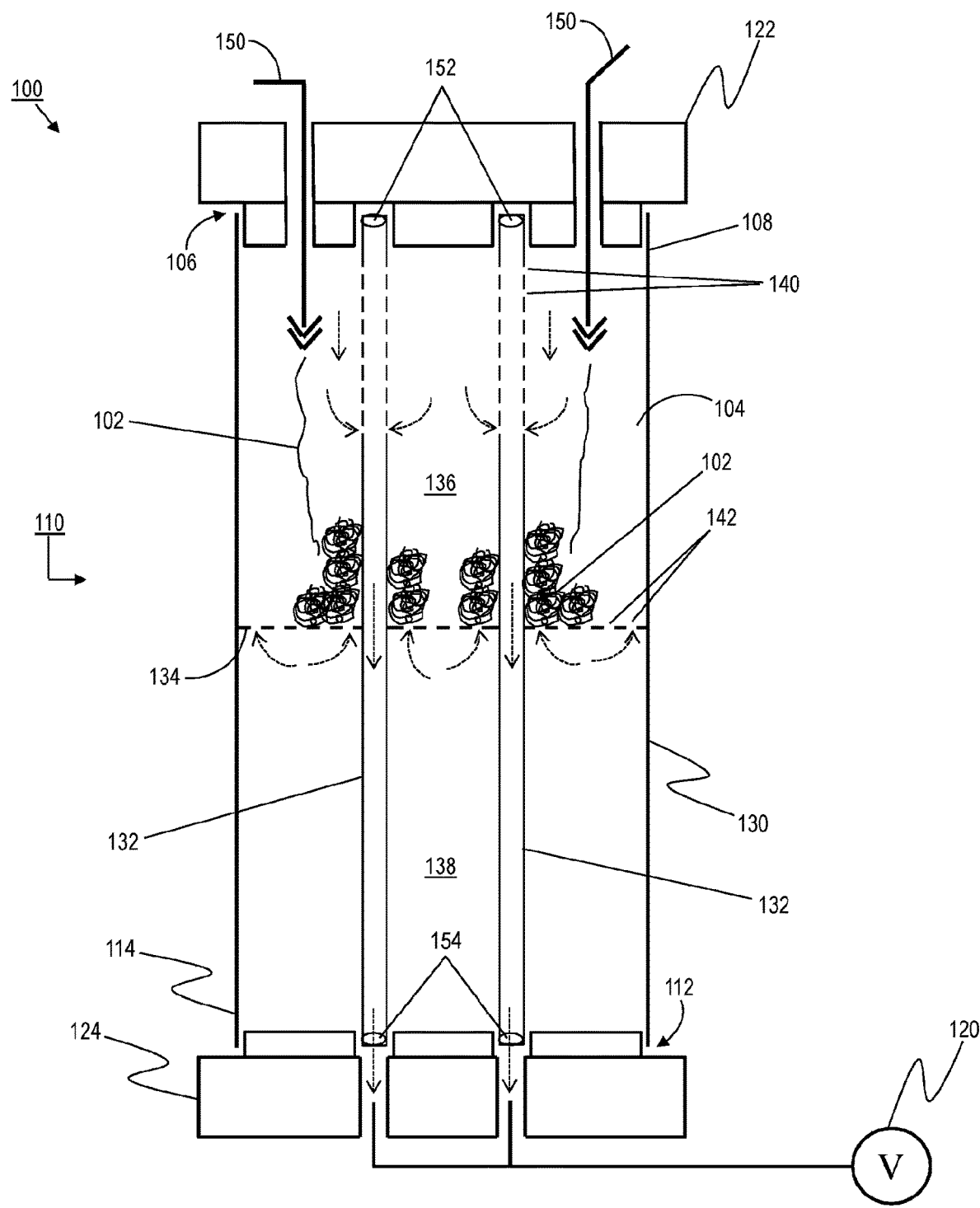
FIG. 1 is a diagram of a conventional filling system for filling a muffler having internal perforations with texturized fibrous material.
Figure 2:
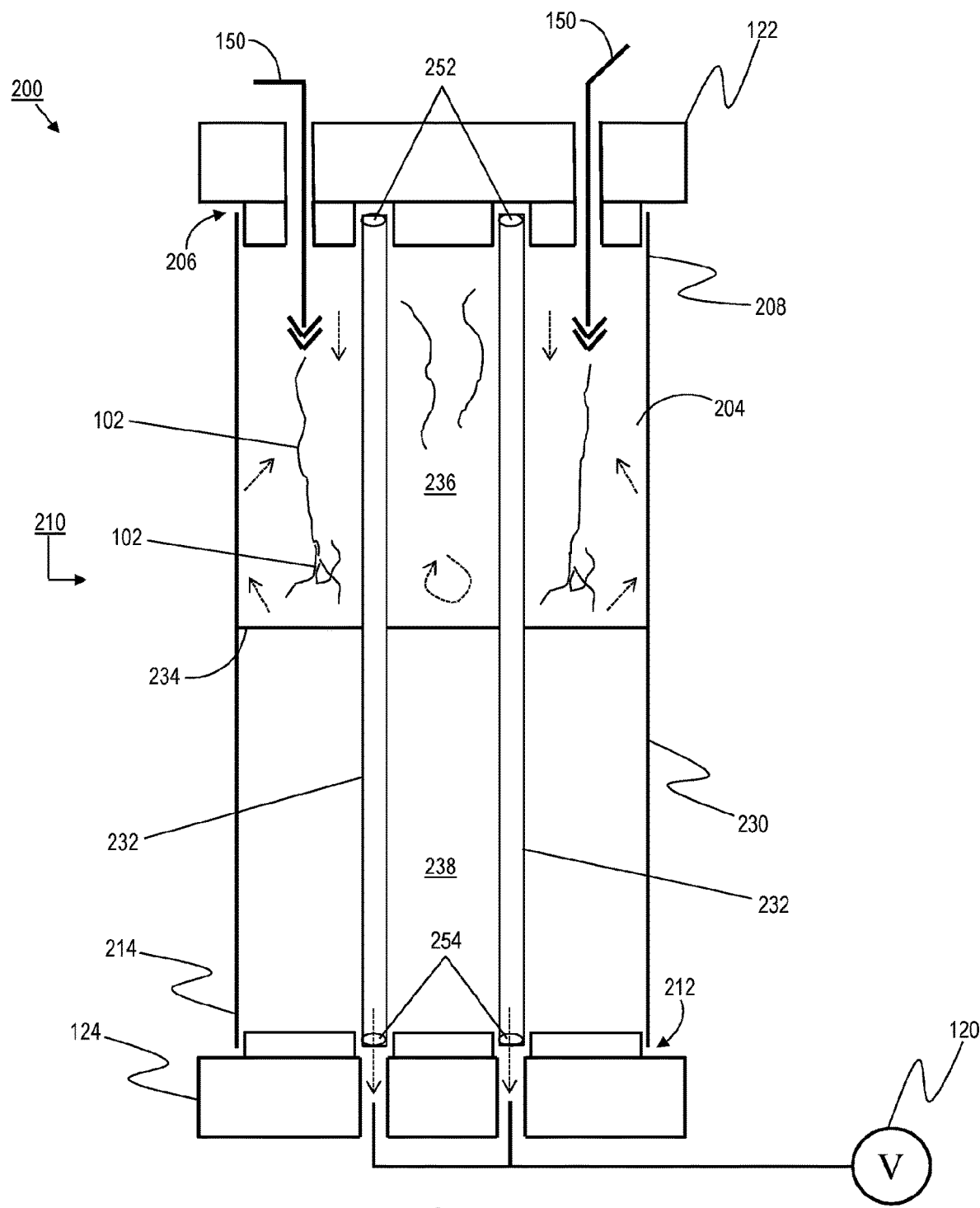
FIG. 2 is a diagram of the filling system of FIG. 1 attempting to fill a muffler lacking internal perforations with texturized fibrous material.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

Figure 3:
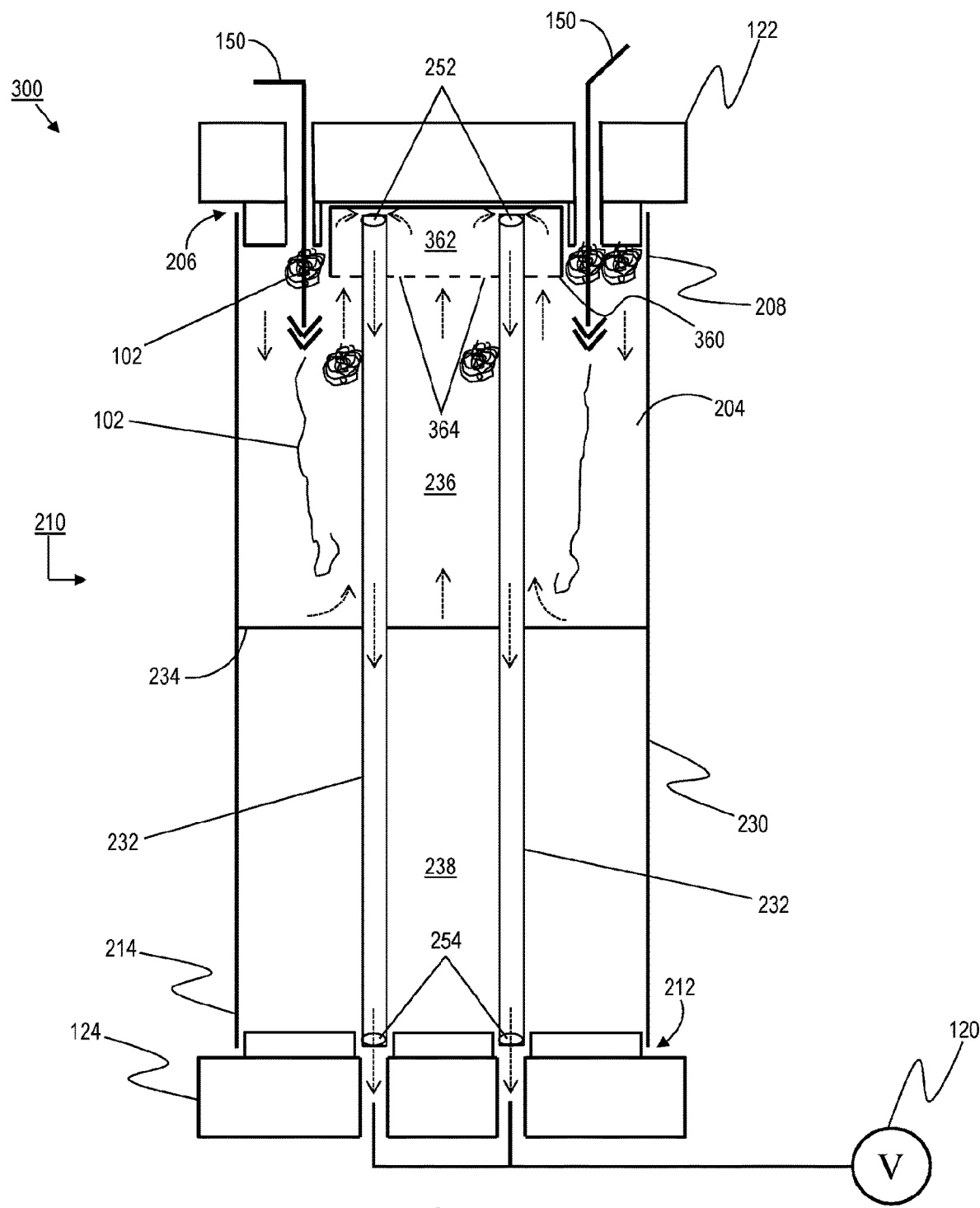
FIG. 3 is a diagram of a filling system, according to one exemplary embodiment, for filling a muffler lacking internal perforations with texturized fibrous material.

Referring now to the drawings, there is shown in FIG. 3 a diagram to illustrate various aspects of the general inventive concepts. In FIG. 3, a filling system 300 allows for suitable evacuation of air being introduced into a muffler during a filling operation, even in the absence of perforations (or suitable perforations) in the pipes or baffles therein.

As shown in FIG. 3, the filling system 300 introduces texturized fibrous material 102 into a muffler cavity 204 via an opening 206 on a first end 208 of a muffler 210, while a partial vacuum ($\Delta P$) is created at an opening 212 on a second end 214 of the muffler 210 (opposite the first end 208) by a vacuum source 120.

The muffler 210 includes a body 230 with two pipes 232 extending at least partially through the body 230. The pipes 232 can be inlet and/or outlet pipes for carrying the exhaust gases through the muffler 210. Each pipe 232 lacks any perforations (or lacks perforations suitable for sufficiently evacuating the amount of air being introduced into the muffler 210 during the filling operation). The muffler 210 also includes a baffle 234 that divides the muffler cavity 204 into a first chamber 236 and a second chamber 238. The baffle 234 lacks any perforations (or lacks perforations suitable for sufficiently evacuating the amount of air being introduced into the muffler 210 during the filling operation). In the context of the filling system 300, "sufficient evacuation" of the air being introduced into the muffler 210 during the filling operation means that the rate at which the air exits the muffler cavity 204 is greater than or equal to the rate at which the air is being introduced into the muffler cavity 204.

During the filling operation, the muffler 210 is held in place between a first member 122 that interfaces with the first end 208 and a second member 124 that interfaces with the second end 214. Because a body 230 of the muffler 210 is in a partially assembled state, i.e., end caps have yet to be joined to the body 230, the first member 122 interfaces with (e.g., fits into or otherwise covers) the open end 206 of the body 230 and the second member 124 interfaces with (e.g., fits into or otherwise covers) the open end 212 of the body 230. In particular, the first member 122 forms a substantially air-tight interface with the body 230 at the first end 208 and the second member 124 forms a substantially air-tight interface with the body 230 at the second end 214.

The first member 122 includes openings through which texturizing nozzles 150 can be inserted for delivery of the texturized fibrous material 102 into the muffler cavity 204. The first member 122 also fits around or covers any ends 252 of the pipes 232 in proximity to the first end 208 of the muffler 210, wherein the ends 252 can also be separately plugged to prevent any of the texturized fibrous material 102 from being drawn therein.

The second member 124 includes openings through which the vacuum source 120 can interface with any ends 254 of the pipes 232 in proximity to the second end 214 of the muffler 210. One of ordinary skill in the art will appreciate that the vacuum source 120 could interface with any one or more suitable openings in the muffler 210, such as the entire opening 212 at the second end 214 of the muffler 210. In conventional implementations, as described above, the vacuum source 120 is unable to effectively evacuate air from the inner cavity 204 (e.g., the first chamber 236 being filled with the texturized fibrous material 102), including air introduced by the filling nozzles 150, because the lack of perforations (or the lack of suitable perforations) means the air in the inner cavity 204 does not have a sufficient flow path through the pipes 232 and out of the muffler 210 during the filling operation.

To address this problem, the filling system 300 uses a perforated member 360. The perforated member 360 includes a body defining an inner cavity 362. At least a portion of the body, for example, a lower surface thereof, includes a plurality of perforations 364. In general, these perforations 364 are sized to allow air to pass therethrough while preventing the texturized fibrous material 102 from doing so. For example, while the fibers of the texturized fibrous material 102 have a relatively small diameter (e.g., 20 µm), there is a "bridging effect" that prevents the fibers from readily flowing through the perforations 364. Any number of perforations 364 may be used, as long as the perforations 364 allow for "sufficient evacuation" of the air being introduced into the muffler 210 during the filling operation. In some exemplary embodiments, the perforated member 360 includes at least 50 perforations.

In the filling system 300, the ends 252 of the pipes 232 are not plugged. Instead, the perforated member 360 is sized and shaped to at least partially fit into the muffler body 230 via the upper opening 206. In this manner, the ends 252 of the pipes 232 are received within the inner cavity 362 of the perforated member 360. As air is drawn out of the inner cavity 204 through the ends 254 of the pipes 232 by the vacuum source 120, the air within the chamber being filled (i.e., the first chamber 236) is likewise drawn through the perforations 364 in the perforated member 360, into the ends 252 of the pipes 232, through the pipes 252, and out the ends 254 of the pipes 232 as it exits the muffler 210. Thus, by virtue of the perforated member 360, the air being introduced into the inner cavity 204 by the texturizing nozzles 150 has a flow path out of the muffler 210. Various portions of the flow path are illustrated in FIG. 3 by dashed arrows.

By providing a sufficient flow path out of the muffler 210 for the air introduced into the inner cavity 204 by the texturizing nozzles 150, the perforated member 360 facilitates the controlled distribution of the texturized fibrous material 102 within the inner cavity 204. In other words, the perforated member 360 prevents the air being introduced into the inner cavity 204 from disrupting the gradual build up of the texturized fibrous material 102 in the chamber being filled (i.e., the first chamber 236). Thus, an even distribution of the texturized fibrous material 102 within the first chamber 236 to a desired density can be readily achieved, notwithstanding the lack of perforations (or adequate perforations) in the pipes 232 and/or the baffle 234.

The texturized fibrous material 102 may be any material suitable for absorbing and attenuating the sounds produced by exhaust gases, such as those produced by an internal combustion engine. In some embodiments, the texturized fibrous material 102 is fiberglass. In some embodiments, the fiberglass includes one of E-glass filaments and S-glass filaments. The texturized fibrous material 102 will generally have a particular density (e.g., between 50 g/L and 200 g/L).

The perforated member 360 may be made from any material suitable to withstand the filling operation. In one exemplary embodiment, the perforated member 360 is made of metal (e.g., steel, aluminum).

In some exemplary embodiments, the perforated member 360 is integrated with the first member 122.

In some exemplary embodiments, the filling system 300 uses multiple discrete perforated members 360 during a filling operation, for example, with a first perforated member 360 being placed around a first pipe within the chamber being filled and a second perforated member 360 being placed around a second pipe within the chamber being filled.

As noted above, muffler designs encompass a wide variety of shapes, sizes, and configurations. The general inventive concepts are applicable across various muffler designs (e.g., variations in the number, size, shape, and configuration of pipes and baffles). In some exemplary embodiments, the filling system 300 includes a plurality of different perforated members, each of the perforated members corresponding to a specific muffler design or configuration.

The general inventive concepts are also applicable across various filling systems (e.g., variations in the number, size, shape, and configuration of holding members). In some exemplary embodiments, the filling system 300 includes a plurality of different holding members, each of the holding members corresponding to a specific muffler design or configuration.

In some exemplary embodiments, the introduction of the texturized fibrous material 102 occurs on a side of the muffler opposite a side in which the vacuum source 120 is interfaced with the muffler. In some exemplary embodiments, the introduction of the texturized fibrous material 102 occurs on the same side of the muffler at which the vacuum source 120 is interfaced. In some exemplary embodiments, the introduction of the texturized fibrous material 102 occurs on a side adjacent to the side in which the vacuum source 120 is interfaced with the muffler.

Furthermore, while there may be perforations in the pipes and/or baffles within a muffler, those perforations may not be in or adjacent an area of the muffler (i.e., a specific chamber to be filled) where they avoid the aforementioned problems associated with a lack of perforations (or a lack of suitable perforations). The perforated member 360 would also be useful in such a muffler to achieve or otherwise improve an effective filling operation.

Figure 4A:
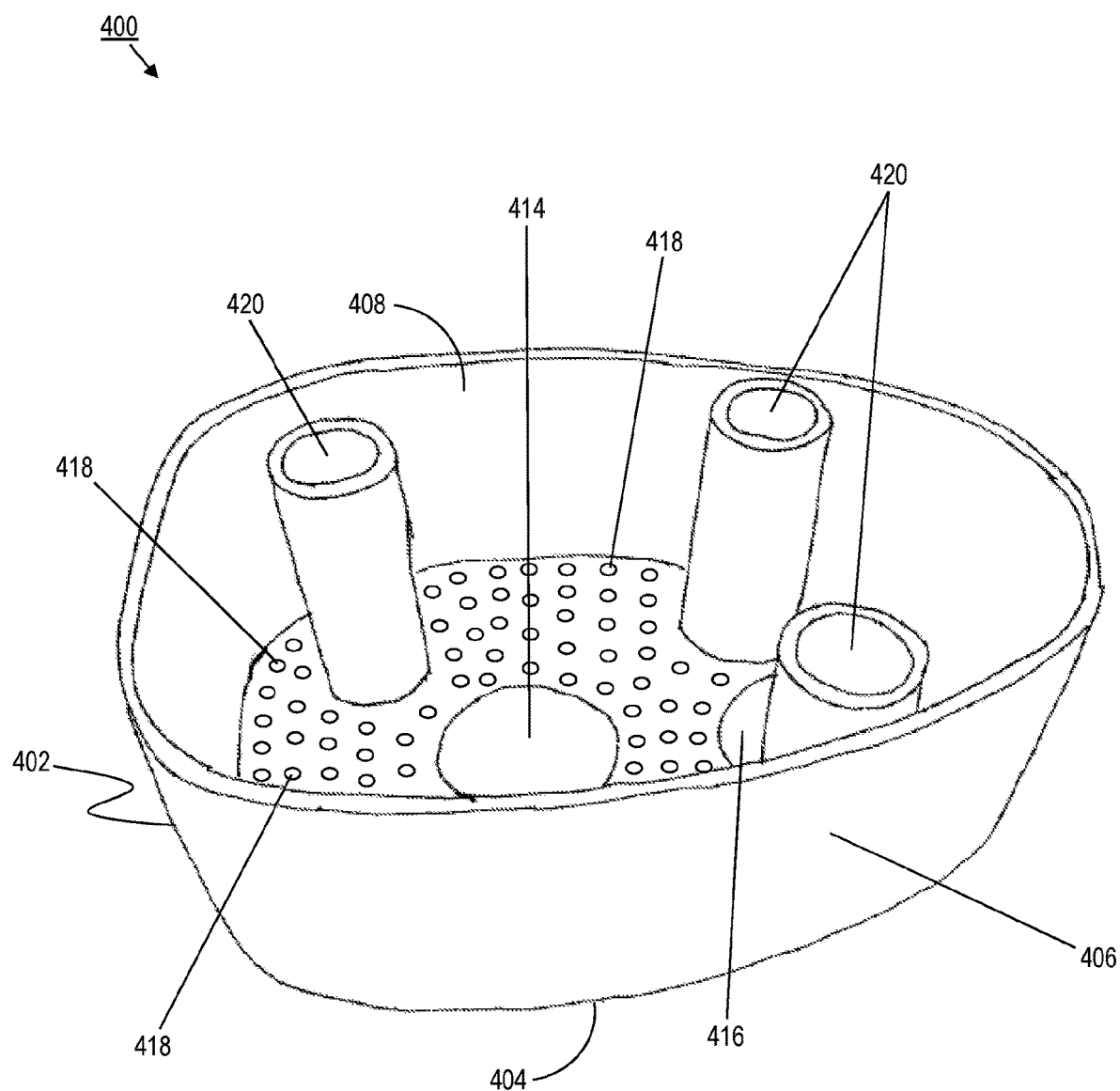
FIGS. 4A-4C illustrate a perforated insert, according to one exemplary embodiment.
Figure 4B:
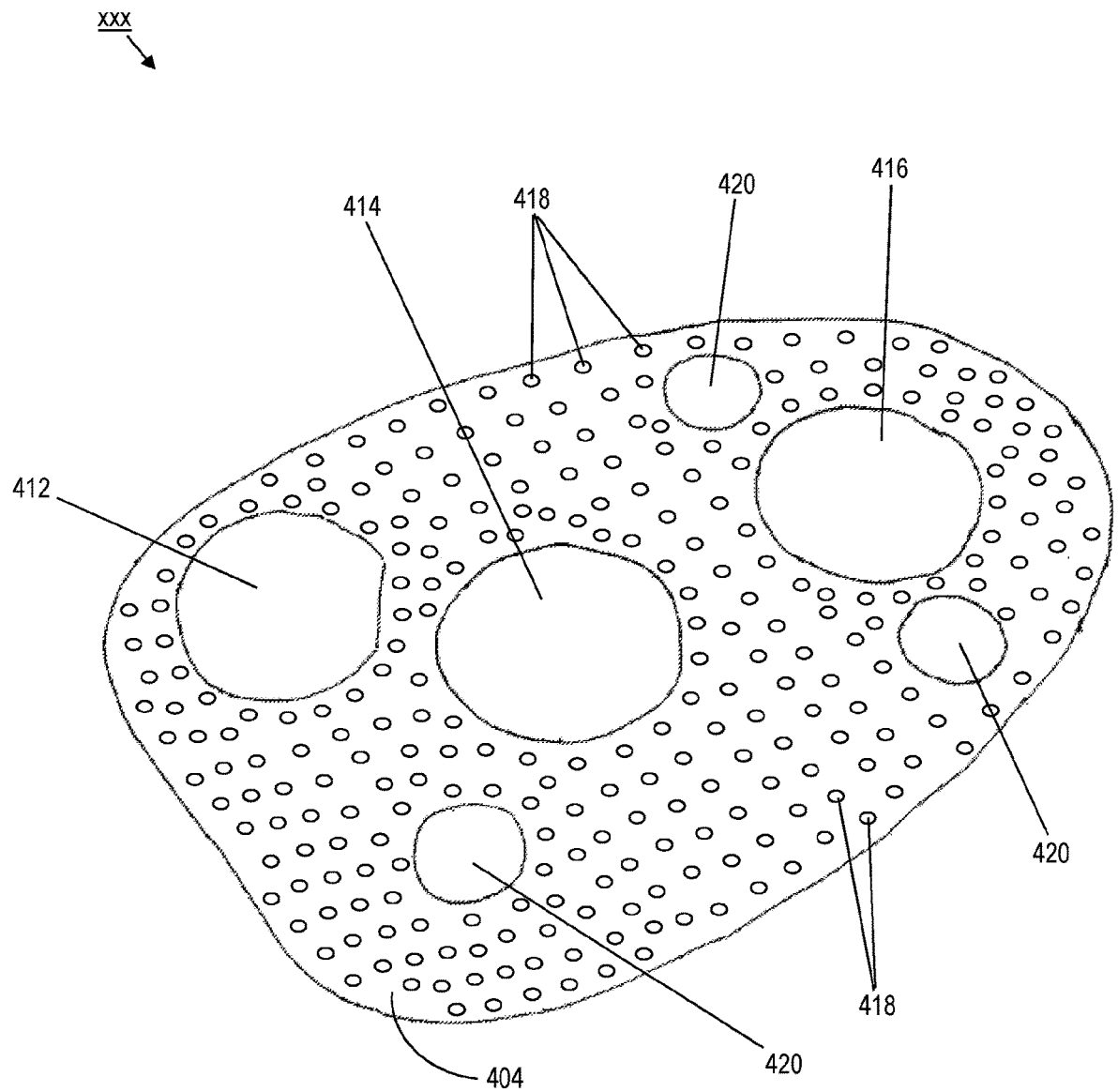
Figure 4C:
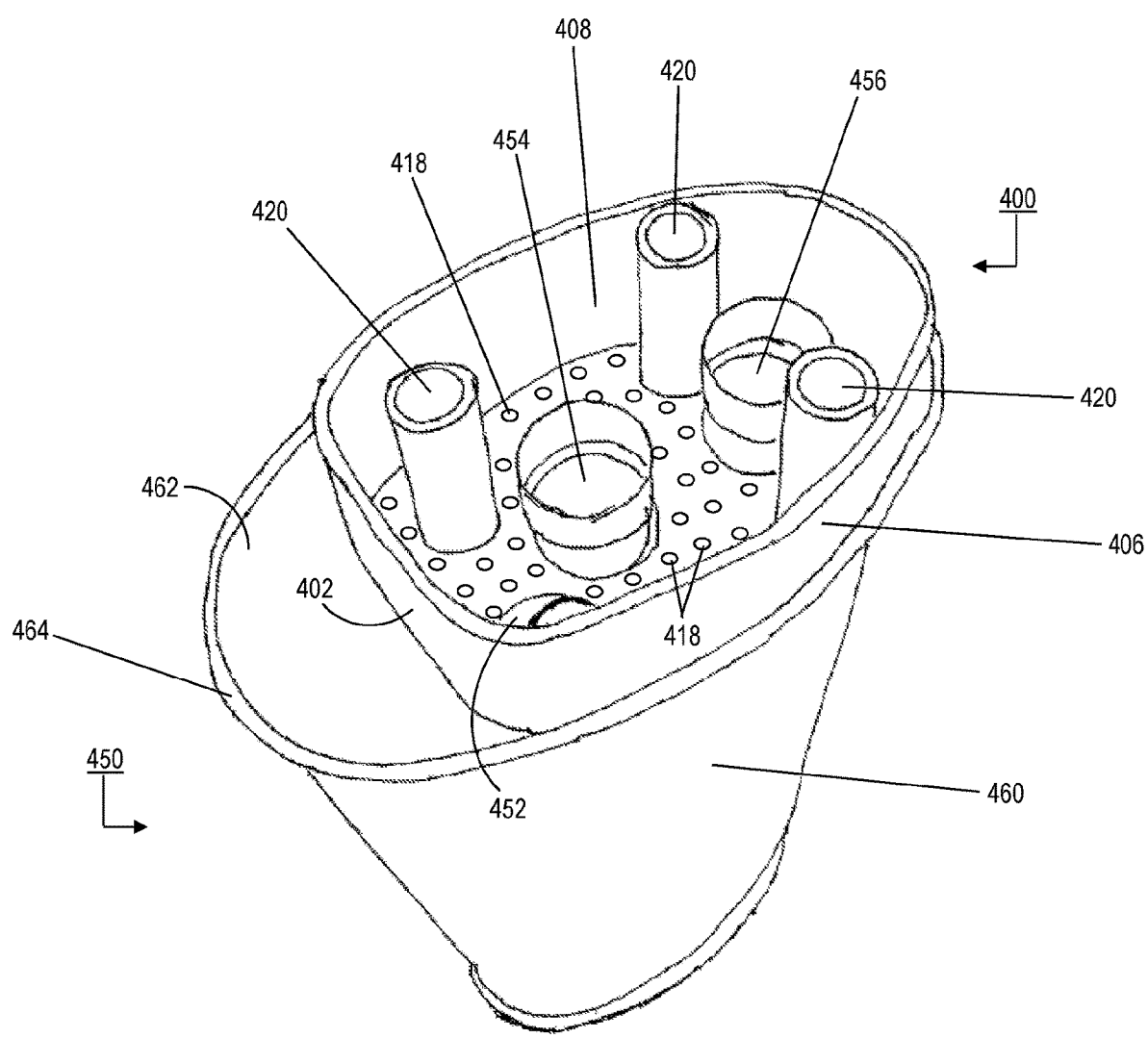

An exemplary embodiment of a perforated member 400 is shown in FIGS. 4A-4C. The perforated member 400 corresponds to the design of a specific muffler 450 (see FIG. 4C). The muffler 450 includes a muffler body 460 having an opening 462 at one end 464 thereof. The muffler 450 also includes a single baffle (not shown). The baffle divides an inner cavity of the muffler 450 into a first chamber and a second chamber. This particular muffler 450 includes three pipes (i.e., a first pipe 452, a second pipe 454, and a third pipe 456) that extend into or through a chamber to be filled with texturized fibrous material (i.e., the first chamber).

The perforated member 400 is a removable insert that includes a body 402 having a lower surface 404 and one or more side walls 406 that define an inner cavity 408 of the insert. In some exemplary embodiments, the body 402 further includes an upper surface (not shown), such as a lid or cover, that encloses the inner cavity 408. The upper surface will typically be parallel to the lower surface 404. In some exemplary embodiments, a holding member (e.g., the first member 122) interfaces with the perforated member 400 to enclose the inner cavity 408.

Three openings (i.e., a first opening 412, a second opening 414, and a third opening 416) are formed in the lower surface 404 of the body 402. Additionally, a plurality of perforations 418 are formed in the lower surface 404 of the body 402. The perforations are sized and/or shaped to allow the air being introduced by the filling process to pass therethrough while preventing the filling material (e.g., the texturized fibrous material 102) from doing so.

In some exemplary embodiments, one or more posts 420 are formed on the body 402. The posts 420 are hollow and extend from the lower surface 404 of the body 402 to the upper surface of the body 402 or, alternatively, to a height similar to the side walls 406 of the body 402. The posts 420 can be used, for example, to pass a filling nozzle (e.g., the texturizing nozzle 150) extending through a holding member (e.g., the first member 122) through the perforated member 400 and into the chamber to be filled with texturized fibrous material (i.e., the first chamber). In other exemplary embodiments, the filling nozzle can be inserted into the chamber to be filled without passing through the perforated member 400.

As shown in FIG. 4C, the perforated member 400 is sized and shaped to at least partially fit into the first chamber through the opening 462. Once so positioned, the first pipe 452, the second pipe 454, and the third pipe 456 of the muffler 450 extend through the corresponding openings (i.e., the first opening 412, the second opening 414, and the third opening 416) in the perforated member 400 such that the ends of the pipes terminate within the inner cavity 408 of the perforated member 400. The side walls 406 of the body 402 may be of any height, but should extend above the ends of the pipes received in the inner cavity 408 so that a first air gap is created above the ends of the pipes. A second air gap should exist between the lower surface 404 of the body 402 and any structure (e.g., the baffle) situated below the perforated member 400. In some exemplary embodiments, the second air gap should have a height of at least 50 mm.

In this manner, the perforations 418 in the perforated member 400 contribute to a flow path by which air introduced into the first chamber during the filling operation can be drawn (e.g., by a vacuum source) through the perforated member 400, into the inner cavity 408, and then through the pipes on the way out of the muffler.

By providing a sufficient flow path out of the muffler 450 for the air introduced into the first chamber by the filling nozzle, the perforated member 400 facilitates the controlled distribution of the filling material within the first chamber. In other words, the perforated member 400 prevents the air being introduced into the first chamber from disrupting the gradual build up of the filling material in the first chamber. Thus, an even distribution of the filling material within the first chamber to a desired density can be readily achieved, notwithstanding the lack of perforations (or adequate perforations) in the pipes and/or the baffle. Likewise, sufficient coverage of the perforations 418 by the filling material is also readily achieved, notwithstanding the lack of perforations (or adequate perforations) in the pipes and/or the baffle.

The general inventive concepts also encompass the perforated insert (e.g., the perforated member 360, the perforated member 400) independent of any specific filling system implementation.

The general inventive concepts also encompass methods that correspond to the exemplary filling systems described above, such as the filling system 300 shown in FIG. 3.

Figure 5:
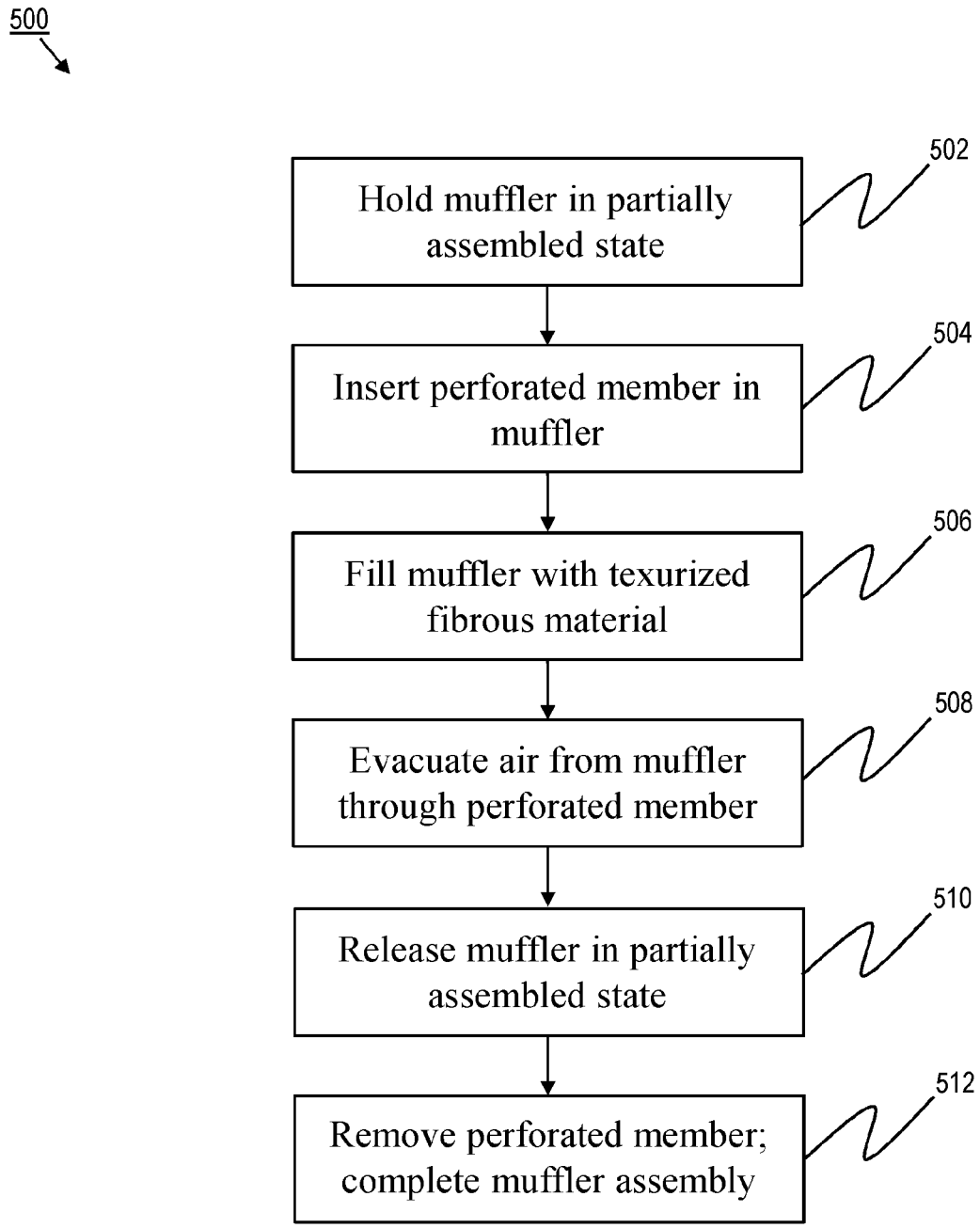
FIG. 5 is a flowchart of a filling method, according to one exemplary embodiment, for filling a muffler lacking internal perforations with texturized fibrous material.

For example, there is shown in FIG. 5 a flowchart to illustrate a filling method 500, according to one exemplary embodiment.

According to the filling method 500, a muffler to be filled is typically positioned or otherwise held in a semi-assembled state (e.g., without the attachment of one or more final pieces, such as the end caps) in step 502. Prior to commencing the filling operation, a perforated member (e.g., the perforated member 400) is inserted into the muffler in step 504.

With the perforated member held in place, the filling operation commences in step 506. The filling operation involves the introduction of a filling material (e.g., the texturized fibrous material 102) into a cavity or chamber of the muffler to be filled. In conjunction with the filling operation, air introduced by the filling operation is evacuated from the muffler in step 508. For example, a suction device (e.g., the vacuum source 120) can be used to draw air through the perforated member and out of the muffler. Typically, step 508 is initiated before step 506. In some exemplary embodiments, steps 506 and 508 are started at the same time. In some exemplary embodiments, steps 506 and 508 are started in relatively quick succession, for example, with step 508 starting at least 1 second before step 506. In general, step 508 occurs for at least as long as step 506 is being performed.

Once the cavity/chamber of the muffler has been adequately filled, the filling operation ceases and the muffler is released by the filling station in step 510. Thereafter, the perforated member can be removed from the muffler, so that the muffler can undergo final assembly in step 512. Final assembly of the muffler can include, for example, affixing (e.g., welding, crimping) the end caps onto the body of the muffler.

It will be appreciated that some aspects of the illustrated muffler assemblies are, in large measure, known in the art, and these aspects may be omitted for purposes of more readily illustrating various aspects of the general inventive concepts. Furthermore, the scope of the general inventive concepts are not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and claimed herein, and any equivalents thereof. For example, while the exemplary embodiments shown and described herein often reference a spun muffler design, the general inventive concepts are not so limited and instead are applicable to any muffler configuration in which at least two housing portions are mechanically joined to one another as part of the muffler assembly.

The invention claimed is:

1. A method of filling a cavity of a muffler with a fibrous material, said muffler including a baffle that divides the cavity of the muffler into a first chamber and a second chamber, the method comprising:

inserting a perforated member into the cavity of the muffler;

holding the muffler so as to affix the perforated member relative to the muffler;

filling the cavity of the muffler with the fibrous material;

evacuating air from the cavity of the muffler through the perforated member and an end of a pipe of the muffler that extends into the perforated member;

positioning the perforated member at a first location in the cavity of the muffler when filling the first chamber with the fibrous material; and positioning the perforated member at a second location in the cavity of the muffler when filling the second chamber with the fibrous material, wherein the perforated member prevents the fibrous material from entering the pipe.

2. The method of claim 1, further comprising releasing the muffler and removing the perforated member from the cavity of the muffler.

3. The method of claim 2, further comprising completing assembly of the muffler.

4. The method of claim 1, wherein the fibrous material is texturized fiberglass.

5. The method of claim 1, wherein the perforated member remains in the cavity of the muffler after assembly of the muffler.

* * * * *